Feb. 10, 1959     M. C. IWERKS     2,873,405
SYMBOL GENERATOR FOR CATHODE RAY TUBES
Filed Nov. 23, 1956
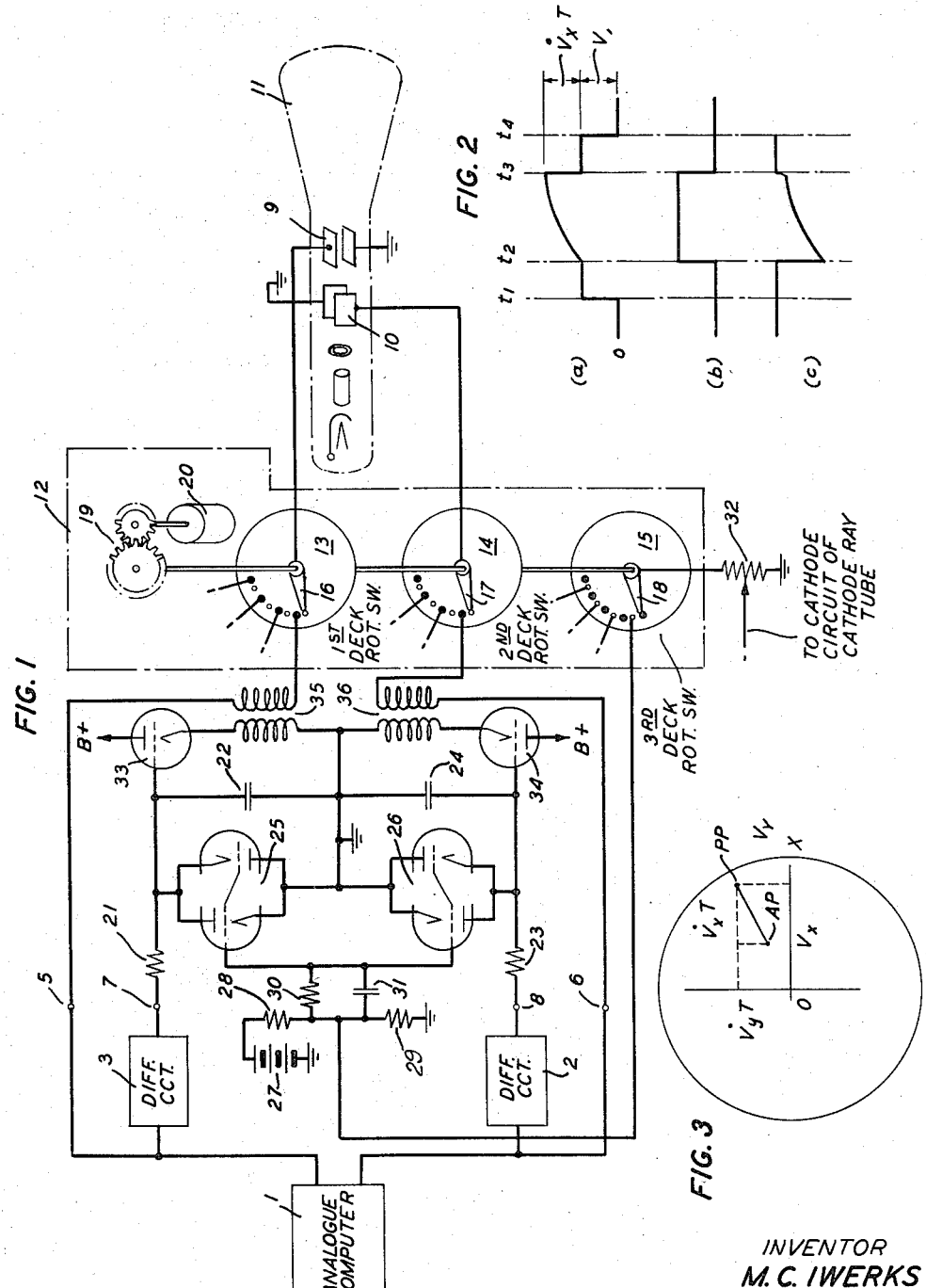
INVENTOR
M. C. IWERKS
BY
Walter M. Hill
ATTORNEY United States Patent Office 2,873,405
Patented Feb. 10, 1959

2,873,405

SYMBOL GENERATOR FOR CATHODE RAY TUBES

Marvin C. Iwerks, Basking Ridge, N. J., assignor to Bell Telephone Laboratories, Incorporated, New York, N. Y., a corporation of New York Application November 23, 1956, Serial No. 624,025

8 Claims. (Cl. 315—22)

This invention relates to cathode ray tube display systems and particularly to the generation of vector symbols on such systems.

Electronic computing and related types of information handling systems often deal with vector quantities. For example, in computers for the study or control of aircraft flight or in fire control computers, quantities representative of the position of the aircraft or target and its predicted direction and velocity are developed. In the operation of such systems it is desirable and usual to provide automatic plotting boards for displaying the position. It is also often desirable to provide a display representing velocity and direction of motion of the aircraft or target.

It is an object of the present invention to provide simplified means of producing on the face of a cathode ray tube straight line symbols whose position, length and direction may be varied to represent simultaneously the values of a plurality of variable quantities.

A particular object of the present invention is to provide facilities for producing on the face of a cathode ray tube a straight line indication, the origin, length and direction of which are indicative of the corresponding quantities of a vector.

Simplification of circuitry for generating vector symbols is made practical by the fact that the application of voltages to the deflection system of a cathode ray tube having identical time rates of change and phase will result in the electron beam traversing a straight line path since the sum of the electrostatic or magnetic forces applied to the beam will vary in a linear fashion.

According to the invention the control of the origin, length, and orientation of a symbol indicative of the corresponding quantities of a vector is achieved by producing one set of voltages determinative of the vector's origin and superimposing on such origin voltages a second set of voltages having identical phase and time rates of change and being representative of the vector's components for controlling the orientation and movement of the electron beam of the cathode ray tube in proportion to these components.

In an illustrative embodiment of the invention, an analog computer and accompanying circuitry supplies first and second sets of voltages. One set of voltages is representative of the rectangular coordinates of the present position of the aircraft or target (the origin of the vector). The second set of voltages represents the respective rectangular components of the velocity of the aircraft or target (vector components). The latter set of voltages is applied to identical time constant circuits that accordingly charge toward the values of their respective velocity voltages. The time allowed for each charge is fixed so that final value of each resulting exponential wave form is representative of a future target position at an instant proportional to the target velocity. The two exponential wave forms are added to the respective ones of the first set of voltages representing present target position or vector origin. When the resultant combined voltages are applied to the respective deflecting electrodes of the cathode ray tube there will be produced on the screen a straight line beginning at the present target position, extending in a like direction of the target's course, and terminating in the target's future position as of the arbitrarily established period. At the termination of the charging period the cathode ray tube is blanked and the time constant circuits are discharged to prepare them for use for a display of information at a later time.

While the two wave forms employed to produce the deflection are exponential rather than linear, the degree of departure from linearity of the two waves is the same for the two orthogonal deflections and the result is that the deflection of the spot on the screen is along a straight line.

The invention will be more fully apprehended from the following detailed description taken in conjunction with the appended drawings in which:

Fig. 1 is a schematic of the preferred embodiment of the invention;

Fig. 2 is a timing diagram of voltages appearing in the circuit; and

Fig. 3 is a typical vector symbol obtained from the preferred embodiment of the invention.

Turning now to Fig. 1 an analog computer 1 is shown which is arranged continuously to provide data as to the present position of an aircraft. This computer may, for example, be similar to the artillery predictor shown in Patent 2,408,081 to C. A. Lovell, et al., issued September 24, 1946. Briefly, the predictor receives the slant range distance to an unknown target from any known form of range finder. Also, by any suitable tracker the predictor receives the angle of azimuth between some assumed axis and the target and the angle of elevation between the horizon and the target. These data are employed by the predictor to produce voltages corresponding to the rectangular coordinates of the target's position. Using these coordinate voltages, the predictor further develops the predicted position of the target at some interval of time $\Delta t$.

The present invention may be employed in conjunction with such a predictor to display the target's present position, course, velocity, and predicted position, as an aid to fire control. This may be readily accomplished by connecting output leads $X_o$ and $Y_o$ of the coordinate converter shown in Fig. 2 of the cited Lovell et al. patent to conventional differentiating circuits 2 and 3 and also connecting these same leads directly to input terminals 5 and 6 of applicant's invention. These leads supply target position $V_x$ and $V_y$, respectively, corresponding to the rectangular coordinates of the target in the X and Y plane. The voltage output of differentiating circuits 2 and 3 is labeled $\dot{V}_x$ and $\dot{V}_y$ and they are supplied to input terminals 7 and 8 of applicant's invention for representing the rate of change of target position or target velocities in the respective coordinate directions.

These two sets of voltages are employed by the invention to produce a vector symbol on the face of a cathode ray tube corresponding to the position, direction of travel, velocity and predicted position of the target. The invention comprises elements which are of simple design and reliable performance and they are uniquely combined to produce an accurate display of target information.

Input terminals 5 and 6 are connected to deflection circuits 9 and 10, respectively, of tube 11 by way of the first and second decks, respectively, of a three deck, multicontact rotary switch 12 such as that described in Bell Laboratories Record, February 1953, pages 41 to 47. Briefly, the switch assembly consists of three plates or discs 13, 14, and 15, each having a series of large and small contact pins arranged in an arc on a contact plate. As shown in Fig. 1, wiper arms 16, 17, and 18 are associated with contact plates 13, 14, and 15, respectively. The respective combinations of wiper arm and contact plate are referred to as first, second, and third decks. The arms are synchronized and driven through gear train 19 by motor 20. On the first and second decks the large contacts are employed as conducting paths whereas the small contacts are employed as dead spots, and in this way transient short circuits caused by a wiper arm bridging a pair of adjacent contacts are eliminated. However, for reasons mentioned hereinafter, in the case of the third deck, the small contacts are employed as conducting paths.

The first large contacts of the first and second decks of switch 12 are each connected to terminals 5 and 6, respectively. Other contacts may be connected to similar circuits if multiple displays are desired or some or all of the contacts may be multipled. Wiper arms 16 and 17 are connected to deflection circuits 9 and 10, respectively. The other terminals of deflection circuits 9 and 10 are grounded.

In connection with the deflection system of tube 11, it should be noted that although deflection plates are indicated the invention is equally operative with magnetic coils. Deflection plates have been chosen purely for convenience of description.

A series time constant circuit comprising resistor 21 and capacitor 22 is connected between terminal 7 and ground with the voltage $V_x$ being applied to terminal 7. An identical time constant circuit comprising resistor 23 and capacitor 24 is connected between terminal 8 and ground with $\dot{V}_y$ being applied to terminal 8.

A double triode 25 is connected across capacitor 22 and the cathodes of each section are connected to the anodes of the other section. Tube 25 controls the charging and discharging of capacitor 22 for either positive or negative potentials appearing at terminal 7. A second double triode 26 is connected across capacitor 24 in a manner identical to, and for the same purpose as, tube 25.

The control grids of tube 25 are connected together and in parallel with the control grids of tube 26. One end of a parallel time constant circuit comprising resistor 30 and capacitor 31 is connected to the midpoint of the parallel grid circuit of tubes 25 and 26. The other end of the parallel time constant circuit is connected to the junction of series connected resistors 28 and 29 which act as a voltage divider, one end of which is grounded and the other end being energized from a direct current voltage source 27.

The first small contact of the third deck of switch 12 is connected to the junction of resistors 28 and 29. As in the case of the contacts of the other decks, other contacts may be multipled or connected to other circuits depending upon the number of displays desired. Wiper arm 18 of switch 12 is connected to a potentiometer 32, the other end of which is grounded. The movable arm of potentiometer 32 is connected to the cathode circuit (not shown) of cathode ray tube 11 as a voltage source for said cathode circuit when potentiometer 32 is connected to source 27 by wiper arm 18.

A triode 33 connected in a cathode follower circuit is arranged to receive the signal input from capacitor 22. The plate of cathode follower tube 33 is connected to a positive supply of direct current voltage (not shown) required for operation of the tube. The primary of transformer 35 is in the output circuit of cathode follower 33. The secondary of transformer 35 is interposed between terminal 5 and the input to the first deck of switch 12 to combine the output of cathode follower 33 with the voltage input to terminal 5.

In similar fashion a triode 34 is connected in a cathode follower circuit and arranged to receive the signal input from capacitor 24. The plate of cathode follower 34 is connected to a source of direct current voltage (not shown) suitable for operation of the tube. The output circuit of cathode follower 34 includes the primary of transformer 36, the secondary of which is connected between terminal 6 and the input to the second deck of switch 12 to combine the output of cathode follower 34 with the voltage input to terminal 6.

It is evident at this point that corresponding circuitry is associated with the horizontal and vertical deflection circuits of tube 11. It follows, therefore, that both deflection systems operate in a similar manner, and that a complete understanding of the operation of the circuit may be had from a description of one of the deflection systems. Accordingly, the operation will be described by referring to Fig. 2 and limiting such description to the horizontal deflection system shown in Fig. 1.

In connection with Fig. 2 it will be noted that there are three parts and in each part the voltage at a different location in the circuit of Fig. 1 is plotted against time for the instants $t_1$ through $t_4$ inclusive which are described in more detail hereinafter. The first part, Fig. 2a, indicates the voltage in the deflection circuit 9 of tube 11. The second part, Fig. 2b, represents the voltage applied to the cathode circuit of tube 11 for unblanking. The third part, Fig. 2c, shows the voltage at the grids of tube 25.

Initially, input voltages $V_x$ and $\dot{V}_x$ are being received from computer 1 and differentiating circuit 3, respectively, and these voltages representative of the target's position and velocity in the horizontal coordinate appear at terminals 5 and 7, respectively. Wiper arm 16 is on a small contact of plate 13 thereby disconnecting the voltage at terminal 5 from the deflection circuit 9. At the same time wiper arm 18 is on a large contact thereby disconnecting source 27 from the cathode circuit (not shown) of tube 11. With the potentiometer 32 out of circuit the voltage at the junction of resistors 28 and 29 is such that both halves of tube 25 are conducting permitting capacitor 22 to discharge either a positive or negative charge previously applied thereto from terminal 7.

At time $t_1$ motor 20 of switch 12 rotates wiper arm 16 to engage a large contact of plate 13. The voltage at terminal 5 is thereupon applied to deflection circuit 9. However, wiper arm 18 still remains on a large contact during this movement and hence no voltage is applied to the cathode circuit of tube 11 for unblanking purposes.

For time $t_1$ Fig. 2a indicates that the voltage in deflection circuit 9 increases from zero to $V_x$ the same as at terminal 5. Fig. 2b indicates that no voltage is applied to the cathode circuit of tube 11 so that tube 11 still remains blanked. The voltage at the grid of tube 25 is shown in Fig. 2c, and since there is no change from the initial condition, tube 25 maintains capacitor 22 in a discharged condition.

At time $t_2$ motor 20 has rotated wiper arm 18 to engage the next small contact of the plate 15. However, wiper arm 16 remains on the large contact of plate 13. Thus, the voltage at terminal 5 continues to be applied to deflection circuit 9. Wiper arm 18 being on the small contact, connects potentiometer 32 to the junction of resistors 28 and 29. Connecting the potentiometer into the voltage divider lowers the voltage at the junction of resistors 28 and 29. The voltage at the tap of potentiometer 32 is sufficient to so bias the cathode of tube 11 as to unblank the tube. The reduced voltage at the resistor junction lowers the positive bias of tube 25, placing it in a nonconducting condition. The parallel resistor-capacitor circuit of resistor 30 and capacitor 31 has a time constant which insures that tube 25 will be cut off for the period that wiper arm 18 is on a small contact.

With tube 25 cut off, capacitor 22 charges toward the voltage $\dot{V}_x$ appearing at terminal 7 in accordance with the time constant of resistor 21 and capacitor 22. The voltage appearing across capacitor 22 is applied as a signal voltage to cathode follower 33. The output of cathode follower 33 is added to the voltage at terminal 5 in the secondary of transformer 35 and the combined voltages are supplied to deflection circuit 9, As shown in Fig. 2a, between the times $t_2$ and $t_3$ the voltage in deflection circuit 9 increases to $V_x + \dot{V}_x T$, where T is a factor representing a known time $t_2$ to $t_3$. In the same period as shown in Fig. 2b an unblanking voltage is applied to cathode ray tube 11 which activates the electron beam of the tube. As shown in Fig. 2c, the voltage at the grids of tube 25 is reduced at time $t_2$ by an amount equal to the change in voltage at the junction of resistors 28 and 29. This cuts off tube 25 permitting the charging of capacitor 22. The time constant of circuit 30—31 is sufficiently long that tube 25 will remain cut off for the period $t_2$—$t_3$. At the time $t_3$ when potentiometer 32 is removed from the voltage divider the grid voltage falls back to a value that caused tube 25 to be conductive and is held at that value by grid conduction.

At time $t_3$ the motor 20 rotates wiper arm 18 off the small contact of plate 15, but wiper arm 16 continues to remain on the large contact of plate 13. It will be evident at this point that the use of large and small contacts on plates 13 and 15 as conducting paths accomplishes the required sequential switching action of the invention with a single switch.

The movement of wiper arm 18 off a small contact disconnects potentiometer 32 from the junction of resistors 28 and 29 thereby removing the voltage to the cathode circuit of tube 11 which, in turn, blanks tube 11. The voltage at the junction increases, which again results in tube 25 being placed in a conducting condition. The capacitor 22 is discharged through tube 25 thereby removing the signal input to cathode follower 33. Hence, the only voltage applied to the circuits of tube 11 is the voltage at terminal 5 which has no effect since the tube is blanked. Again Figs. 2a, 2b, and 2c show the foregoing voltage conditions in the invention.

At time $t_4$ motor 20 moves wiper arm 16 off the large and on to the small contacts of plate 13. Wiper arm 18 continues to remain on the large contact of plate 15. This movement of wiper arm 16 disconnects the voltage at terminal 5 from the deflection circuit 9. As indicated at time $t_4$ of Figs. 2b and 2c, the respective voltages remain the same as described for $t_3$. Fig. 2a shows that the deflection circuit voltage is reduced to zero.

Capacitor 22 is completely discharged by the time motor 20 has rotated wiper arms 16 and 18 to the next set of large and small contacts of plates 13 and 15, respectively, which resets the circuit to repeat the same sequence of events.

In Fig. 3 the straight line symbol produced by the described embodiment of the invention is shown as it appears on the face of tube 11 with the center of the tube representing the origin of a system of horizontal and vertical rectangular coordinates. At time $t_2$ shown on Figs. 2a, 2b, and 2c the electron beam of tube 11 is activated and a spot appears indicating the present position (PP) of the target as represented by the voltages $V_x$ and $V_y$ supplied to deflection circuits 9 and 10, respectively. Capacitors 22 and 24 commence to charge, as discussed above, causing the electron beam of tube 11 to move as the varying electrostatic forces are applied to the beam. The ratio of the voltages of capacitors 22 and 24 remains constant with time which results in the electrostatic forces of the tube moving the beam in a straight line direction. The movement of the electron beam produces a symbol whose orientation and length are indicative of the target's course and position at a future time since voltages $\dot{V}_x T$ and $\dot{V}_y T$ correspond to the travel of the target in the horizontal and vertical coordinate planes. The end point of the symbol is the approximated position (AP) of the target since the length of the symbol is the vector sum of the target's anticipated movements in the horizontal and vertical coordinate planes during the next cycle of operations. The symbol moves about the face of tube 11 in accordance with the target's movements and one end of the symbol indicates the present position of the target at the same time the other end indicates the approximated or future position of the target. Employing a different scale factor the length of the straight line (AP—PP) of course represents the velocity of the target.

It may also be readily shown that networks similar to that disclosed may be employed to produce a straight line having a fixed direction and length. These networks may be successively combined to produce straight line symbols representative of quantities other than vectors. Hence, the principles involved herein are susceptible of numerous other applications which will be apparent to persons skilled in the art. The invention, therefore, is to be limited only by the scope of the appended claims.

What is claimed is:

1. Apparatus for producing on the face of a cathode ray tube having cathode and deflection circuits straight line indications whose origin, length and direction may be varied to correspond to a vector quantity comprising, a first two sources of voltages representing respectively the rectangular coordinates of the origin of the vector quantity, a second two sources of voltages representing respectively the rectangular coordinates of the magnitudes of the components of the vector quantity, means for intermittently connecting the voltages from the first two sources to the deflection circuits corresponding to the coordinate represented by the voltage, two identical time constant circuits each including a capacitor to receive from said second sources a voltage indicative of the magnitude of a predetermined vector component, discharge means connected across said capacitors, a source of tube unblanking voltage, means for intermittently rendering said discharge means inoperative and connecting the source of unblanking voltage to the cathode circuit to activate the electron beam of said tube, and means for combining the capacitor voltages with the respective voltage of such first two sources in the same coordinate of the indication.

2. The further combination in accordance with claim 1 of timing means for controlling the operation of the intermittent connecting and disconnecting means.

3. Apparatus according to claim 2 wherein the discharge means comprises vacuum tubes connected across said capacitors and arranged to conduct positive and negative capacitor voltages to ground, and means for normally biasing said vacuum tubes conductive.

4. Apparatus for producing on the face of a cathode ray tube straight line indications whose origin, length and direction may be varied to correspond to a vector quantity comprising tube deflection and cathode circuits, said tube being unblanked, a first two sources of voltages representing respectively the rectangular coordinates of the origin of the vector, a second two sources of voltages representing respectively the rectangular coordinates of the magnitudes of the components of the vector quantity, means for intermittently connecting the voltages of the first two sources to the deflection circuits corresponding to the coordinates represented by the voltages, identical time constant circuit each including a capacitor to receive from said sources a voltage indicative of the magnitude of a predetermined vector component, means for combining the capacitor voltages with the respective voltage of the first two sources in the same coordinate of the indication, means for intermittently blanking the tube, means for discharging the capacitors, and timing means for controlling the operation of the intermittent connecting, blanking and discharging means.

5. Apparatus according to claim 4 wherein the means for discharging the integrating circuits comprises vacuum tubes connected across said capacitors and arranged to conduct positive and negative voltages to ground, means for normally biasing said vacuum tubes nonconductive, and timing means for insuring that said biasing means maintain said vacuum tubes nonconducting during the period that the cathode ray tube is unblanked.

6. A circuit for displaying vector quantities as straight line symbols comprising, a cathode ray oscilloscope having a set of orthogonal ray deflectors, and ray blanking means, a source of a pair of voltages representing the respective rectangular coordinates of the origin of the vector, a source of a second pair of voltages representing the respective rectangular vector components, a pair of resistor-capacitor circuits of substantially equal time constants, controllable discharge means for each of said capacitors, and timing means providing a cycle of three periods in the first of which the discharge means are operable to discharge the respective capacitors and the oscilloscope is blanked, in the second of which said discharge means are rendered inoperable, the second pair of voltages are applied to the respective resistor-capacitor circuits to charge the capacitors, the capacitor voltages are added to the respective ones of the first pair of voltages and applied to the respective ones of the pair of orthogonal ray deflectors and said oscilloscope is unblanked, and in the third of which said oscilloscope is blanked and said discharge means are rendered operable.

7. An apparatus for displaying a vector symbol representative of the position, the motion and the velocity of an object in a plane under observation, said apparatus comprising means for receiving two continuously varying voltages respectively representative of the two rectangular components of the instantaneous position of said object in said plane, means for differentiating each of said voltages to derive voltages representative of their corresponding velocity components, means for deriving a continuously increasing voltage from each of said velocity component voltages during successive fixed time intervals, the final values of said voltages at the ends of said intervals being proportional to their respective velocity component voltages, means for adding each of said continuously increasing voltages to its corresponding position component voltage, a cathode ray oscillograph having vertical and horizontal deflection means and a beam blanking means, means for impressing said added voltages respectively to said two deflection means, and means connected to said blanking means for releasing said beam only during said fixed time intervals.

8. The combination of claim 7 wherein said means for deriving the continuously increasing voltages from the two velocity component voltages comprises a pair of substantially identical networks, each including a capacitor across which said voltage is derived.

References Cited in the file of this patent

UNITED STATES PATENTS

| | | |
|---|---|---|
| 2,406,858 | Shepherd | Sept. 3, 1946 |
| 2,563,967 | Sherwin | Aug. 14, 1951 |
| 2,571,051 | Mizen | Oct. 9, 1951 |
| 2,661,421 | Talamini | Dec. 1, 1953 |
| 2,694,160 | Rea | Nov. 9, 1954 |